United States Patent [19]

Cukrowski

[11] 4,168,069
[45] Sep. 18, 1979

[54] STACKING SPINDLE FOR A PHONOGRAPH RECORD CHANGER

[75] Inventor: Georg Cukrowski, Berlin, Fed. Rep. of Germany

[73] Assignee: U.S. Philips Corporation, New York, N.Y.

[21] Appl. No.: 907,188

[22] Filed: May 18, 1978

[30] Foreign Application Priority Data

May 21, 1977 [DE] Fed. Rep. of Germany ....... 2723043

[51] Int. Cl.² .................... G11B 17/04; G11B 17/12
[52] U.S. Cl. .................................................. 274/10 S
[58] Field of Search ..................................... 274/10 S

[56] References Cited

U.S. PATENT DOCUMENTS 3,892,415  7/1975  Takahashi et al. ................ 274/10 S Primary Examiner—Harry N. Haroian
Attorney, Agent, or Firm—David R. Treacy

[57] ABSTRACT

An umbrella-type stacking spindle for a record changer with end-stop function for the playing mode. Groups of clamping and supporting levers are accommodated in a tube, and move outward in response to movement of respective clamping and control sleeves during a changing cycle. The sleeves are separately movable with respect to a single actuating rod, which is controlled by the changing device. The control sleeve is locked to the tube for a given range of movement of the actuating rod, while the end-stop function is signalled by blocking movement of the actuating arm.

5 Claims, 7 Drawing Figures

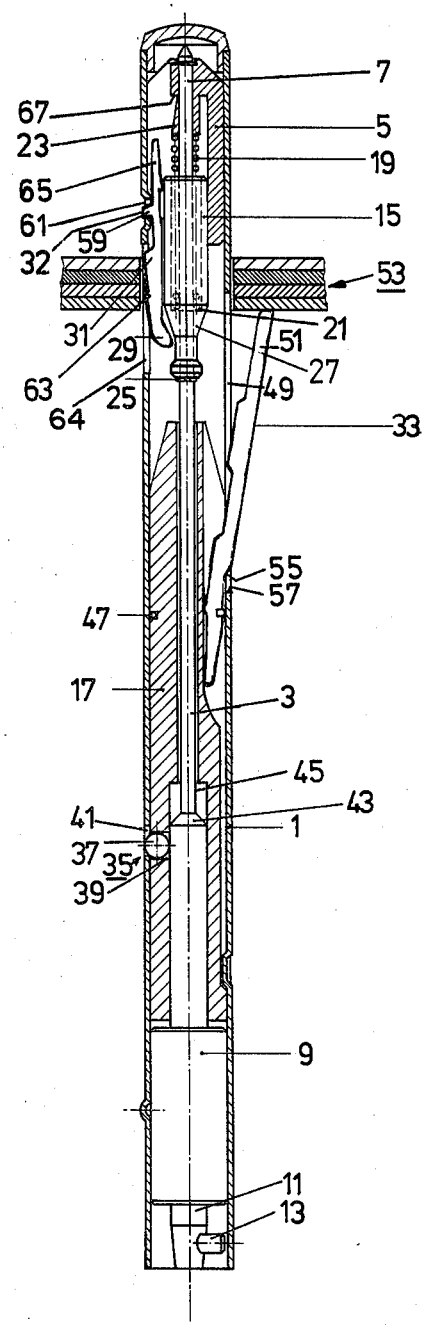
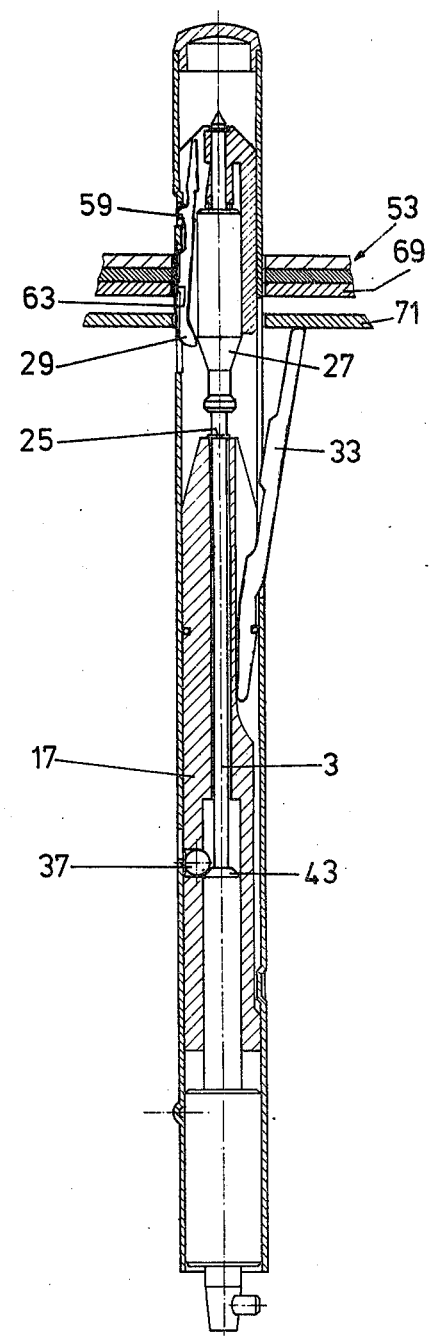

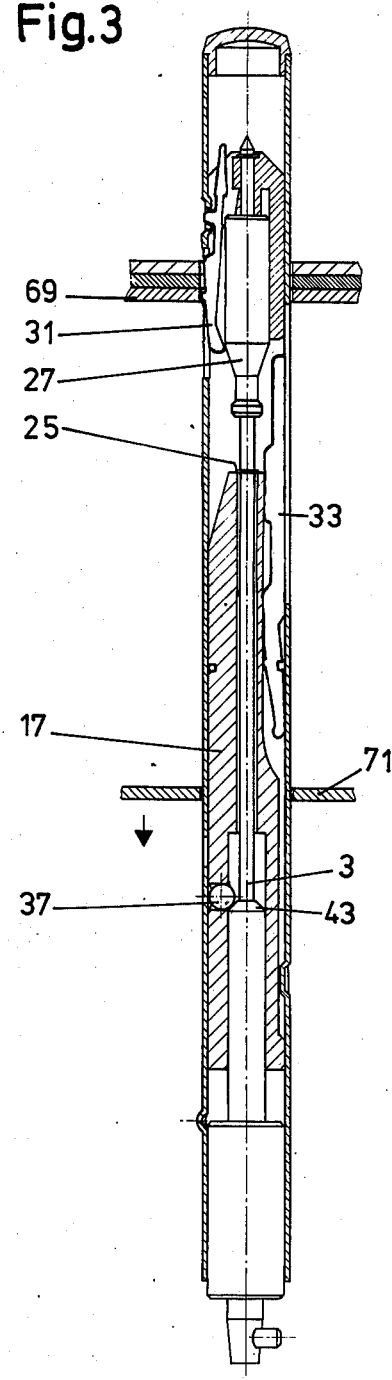
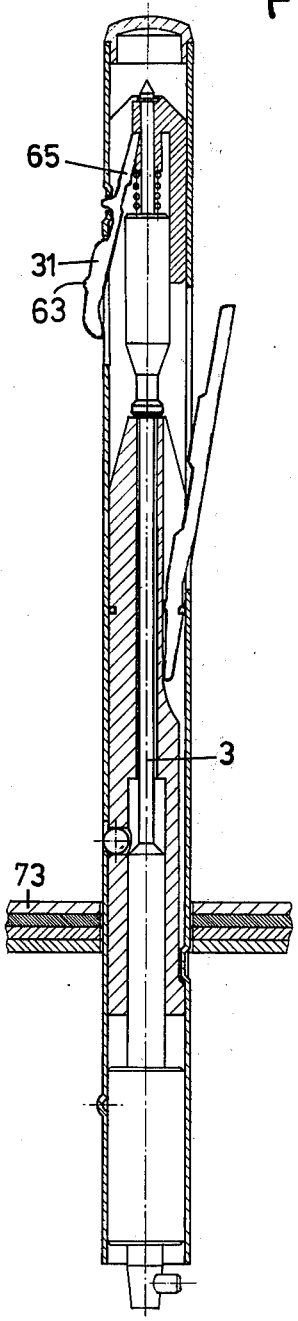

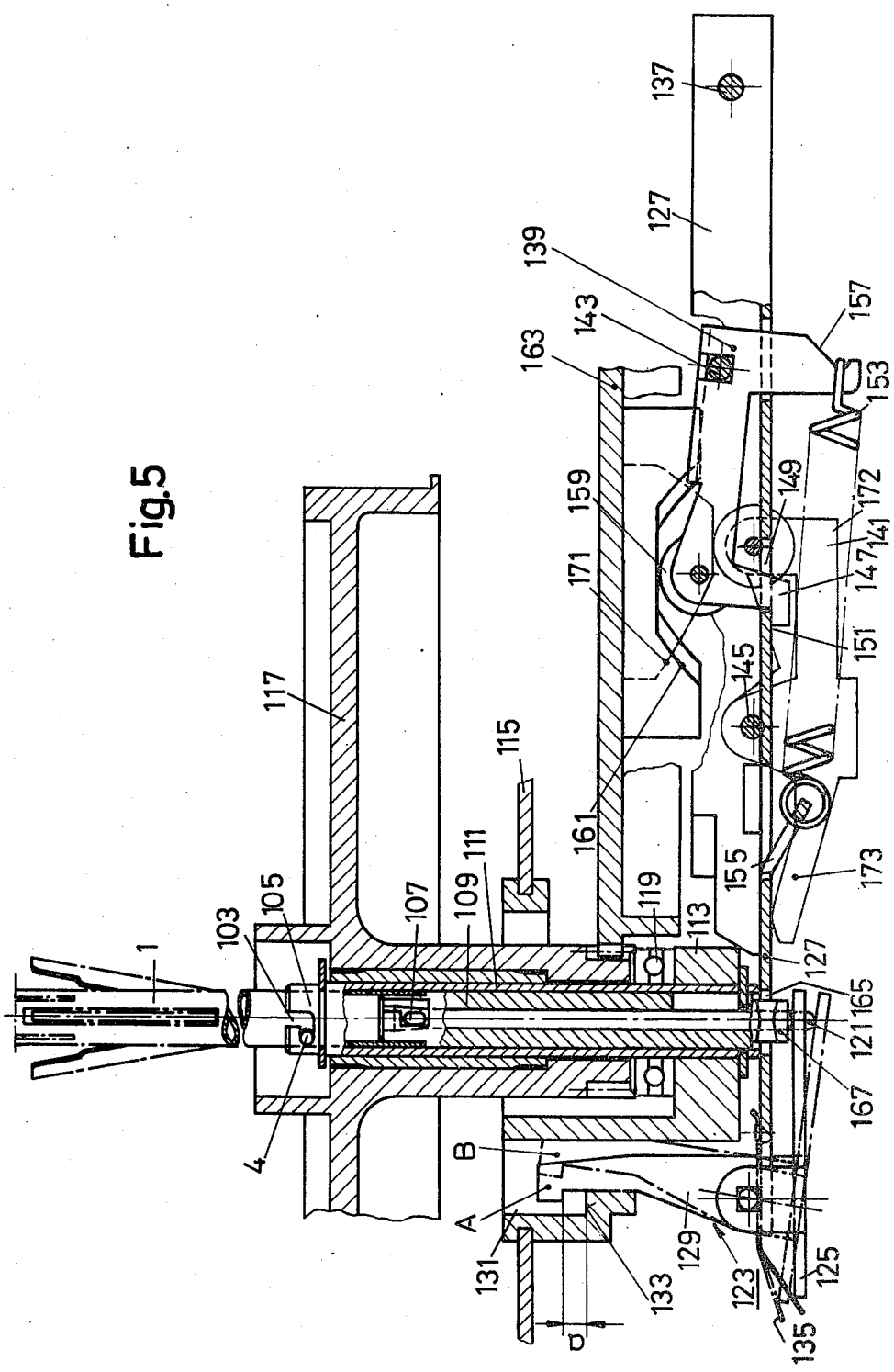

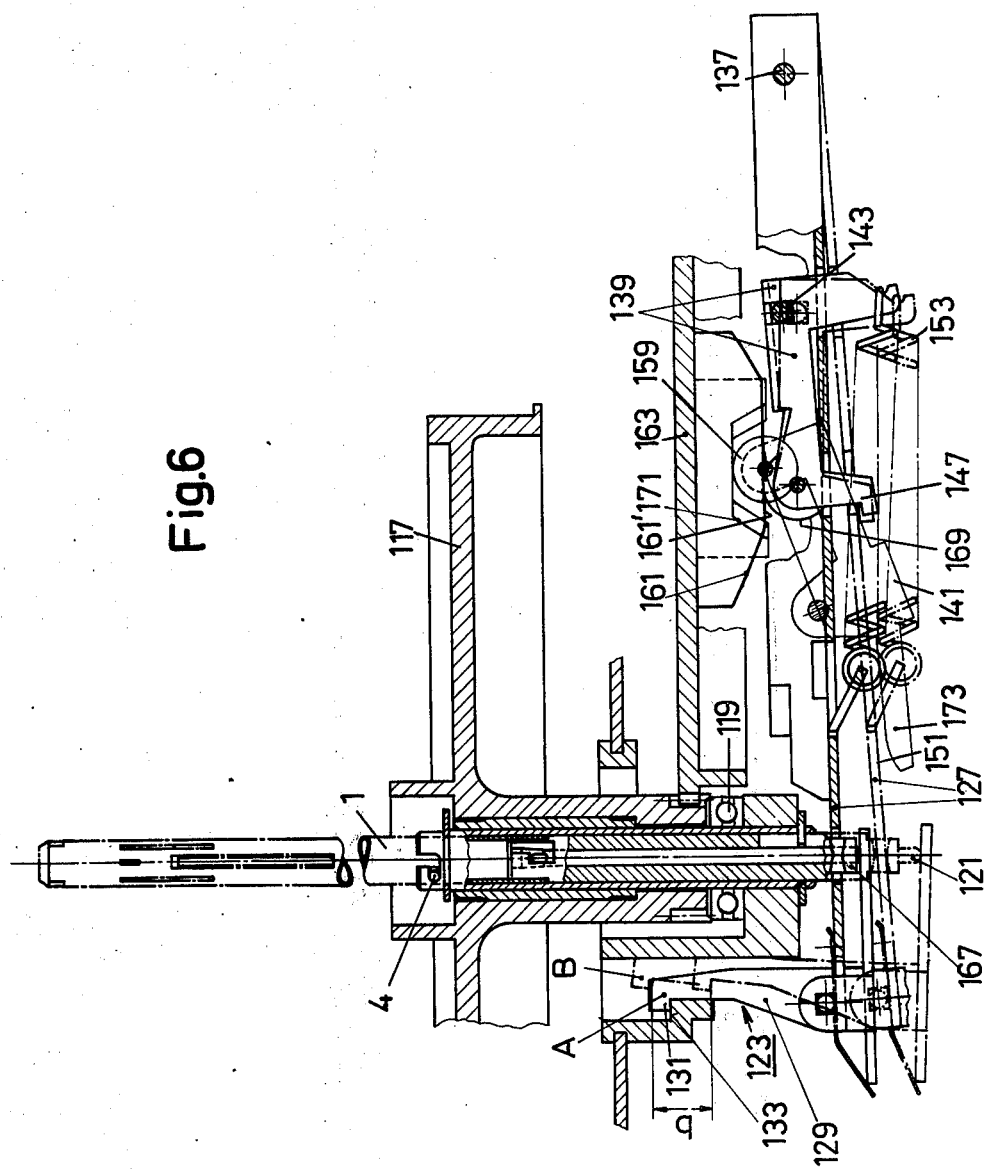

STACKING SPINDLE FOR A PHONOGRAPH RECORD CHANGER

BACKGROUND OF THE INVENTION

The invention relates to a stacking spindle for a phonograph record changing apparatus (hereinafter referred to as a record changer); and more particularly to a record changer having an end-stop function for the playing mode, and an umbrella-type changer spindle having groups of clamping and supporting levers which are accommodated in a tube, which levers upon a command from the automatic changing mechanism are actuated by the changing device so as to perform a mutually coordinated movement. An actuating rod, which is controlled by the changing device, acts on the group of clamping levers through a clamp sleeve which is movable on the rod.

Such a stacking spindle is known from German patent specification No. 11 28 166, to which U.S. Pat. No. 3,081,093 corresponds. The actuating rod then extends from the top to the bottom inside the tube, and a pressure spring ensures that in the normal position the actuating rod is pressed into its highest position. The clamp sleeve is slidably fitted on the actuating rod, and the clamping levers are pivotably journalled to the sleeve in such a way that their lower ends can be pressed out of the tube. An additional pressure spring ensures that the clamp sleeve and the clamping levers on the actuating rod are urged downwards as far as a stop. The supporting levers are directly suspended to the actuating rod and, when the actuating rod is pulled downwards, they can be pivoted inwards by the tube edges. For the end stop function an additional rod is provided which, if there is no longer any record on the stacking spindle, moves further downwards because the clamp sleeve which guides the clamping levers moves downward.

This stacking spindle, which operates with a so-called top load, demands substantial tensile forces, which are to be produced by the changing device. Moreover, the stacking spindle is of comparatively complicated construction, considerable space is needed for the end-stop rod. Finally, a further major disadvantage is that the movement of the supporting levers is rigidly coupled to the movement of the actuating rod. As a result of this, the tolerance on the freedom of movement of the actuating rod is quite limited.

SUMMARY OF THE INVENTION

It is an object of the invention to provide a stacking spindle for a record changer, which enables the travel of the actuating rod to be adapted widely to the requirements of the changing device.

A further object of the invention is to reduce the force required for actuation of an umbrella-type spindle and eliminate the need for a separate end-stop rod.

This object is achieved with a stacking spindle in accordance with the invention, a single actuating rod is guided inside the tube, and acts on separate control sleeves for the two groups of clamping and supporting levers, the control sleeves being movable relative to said rod, and the control sleeve for the supporting levers being locked with respect to the tube by the actuating rod during part of the cycle.

As the movement of the supporting levers is largely independent of the movement of the actuating rod, the designer of a changing device is given greater freedom of construction.

In accordance with a further embodiment of the invention the movement of the actuating rod is produced without any unidirectionally pretensioning spring bias forces and is determined solely by the changing device in both directions of movement. Because of the absence of a pretensioning spring force, the changing device need not develop for forces necessary to overcome such a spring. This further simplifies and facilitates the construction.

In a preferred embodiment of the invention the control sleeve for the supporting levers can be locked vertically with respect to the tube by a ball latching device which engages the actuating rod when the clamping levers have not yet been swung out. The ball latching device includes a ball, a radical hole in the control sleeve in which the ball is lodged and an aligned opening in the outer sleeve, whose diameter is smaller than that of the ball. The actuating rod has a sloping surface or latching cone, which releases the ball for inward travel when the actuating rod has moved down so far that the outward movement of the clamping levers is completed, after which a snap ring on the actuating rod can move the supporting-lever control sleeve thus released downwards.

In accordance with a further embodiment of the invention a guide means for the top of the actuating rod is provided with a stop edge above the group of clamping levers, which edge engages with an extension arm of at least one clamping lever, so as to block guide means movement when the clamping lever is swung out further in the absence of a record, so that the extension arm of the clamping lever can swing farther inwards in front of the stop edge. Thus, the travel of the actuating rod can be blocked by the clamping lever in the absence of a record. Thus the actuating rod can then be pulled out of the tube a shorter distance than in the case that at least one record remained on the stacking spindle. The shorter pull-out path is an indication for the end stop, which is interpreted accordingly by the changing device.

The invention will be described in more detail with reference to the drawings which show a preferred embodiment.

BRIEF DESCRIPTION OF THE DRAWING

FIG. 1 is a sectional elevation of a stacking spindle in accordance with the invention in the initial position, FIG. 2 is a similar view of the stacking spindle of FIG. 1 during separation of the lowermost record, FIG. 3 shows the stacking spindle when the lowermost record is dropping, FIG. 4 shows the stacking spindle in the functional position for end stop, FIG. 5 is a partial cross-section through a changing mechanism which controls the stacking spindle in the initial position, FIG. 6 shows the cross-section of FIG. 5 in the changing position with retracted supporting levers.

DESCRIPTION OF THE PREFERRED EMBODIMENT

Figure 7:
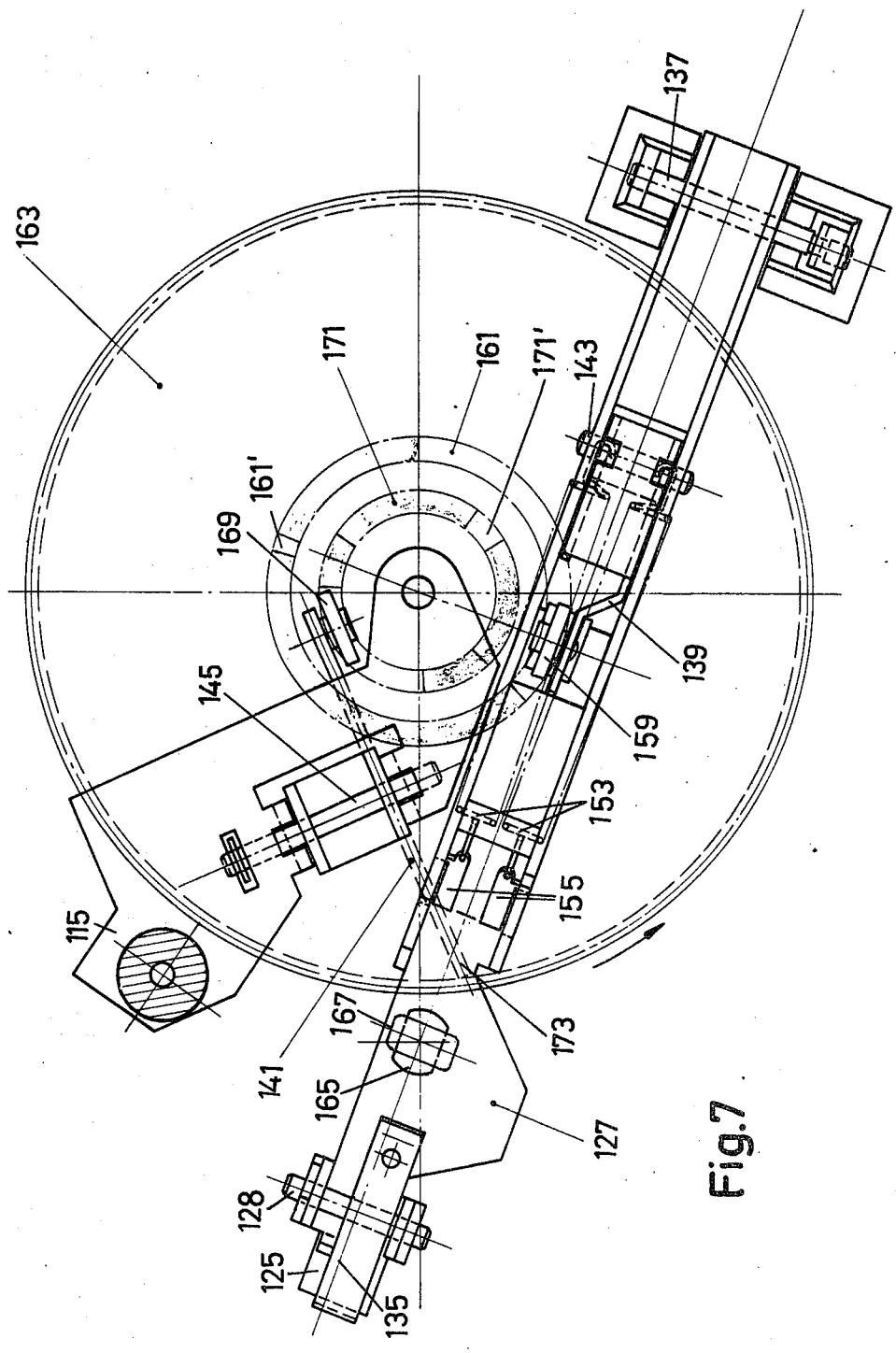
FIG. 7 is a plan view of the lever mechanism of FIGS. 5 and 6 in combination with a partial plan view of the command disc.

The stacking spindle comprises an outer tube 1, in which a single actuating rod 3 is axially movable. The actuating rod 3 is journalled and guided by a profiled member 5 which is secured to the upper end 7 of the actuating rod 3, and a pressure member 9, which is rigidly connected to and guides the lower end of the actuating rod 3. Below the member 9 the lower end 11 of the actuating rod has a laterally projecting pin 13 with which the changing mechanism engages, as is described below.

A clamping sleeve 15 and a control sleeve 17 are separately movable on the actuating rod. The control sleeve 15 has a counterbore which accommodates a pressure spring 19 slipped over the actuating rod 3, the spring extending between the bottom 21 of the counterbore and a central boss 23 on the profiled member 5. A snap ring 25 is locked in a groove on the rod 3 between the clamping sleeve 15 and control sleeve 17, the clamping sleeve 15 bearing against the ring in the initial position under pressure of the spring 19. At the lower end of the clamping sleeve 15 a central downwardly pointing cone 27 is formed by which an inward projection 29 of a clamping lever 31 can be urged outwards. In the initial position of FIG. 1 the clamping sleeve 15 ensures that the clamping levers 31 (around the circumference of the stacking spindle a group of at least three such clamping levers is provided, only one of which is shown) are kept retracted, because the outer wall of the clamping sleeve 15 bears against the clamping levers 31 above a clamping lever pivot 32.

The control sleeve 17 in the lower part of the stacking spindle actuates the supporting levers 33. In the initial position the control sleeve 17 is blocked against axial movement by a ball-latching device 35. This ball-latching device includes a ball 37, which is captured but radially movable in a hole 39 of the control sleeve 17, an opening 41 in the outer tube 1 with a diameter smaller than the diameter of the ball 37, and a cone 43 on the actuating rod 3, which cone is movable with the rod in a widened axial bore 45 of the control sleeve extending above the radial hole 39. In a similar arrangement as the clamping levers 31, a group of three supporting levers 33 is uniformly spaced around the stacking spindle 120° apart. The individual supporting levers 33 are pivotally held by a spring clip 47 arranged so that they can swing out with their upper ends 51 passing through slots 49 in the outer tube 1, in the initial position shown in FIG. 1, so that a stack of records 53 can be supported by the upper ends 51.

As shown in FIGS. 2 and 3, as the rod 3 is moved downward and unlatches the ball latching device 35, the control sleeve 17 abuts the snap ring 25 and is pulled downward also. The oblique faces 55 of the supporting levers 33 then butt against the lower ends 57 of the slots 49, so that the supporting levers 33 are then retracted.

The clamping levers 31 are pivotably mounted in openings 61 of the outer tube 1 by projections 59. Each clamping lever 31 is moreover provided with a short outward projection 63 at a location below the projection 59, which projection 63 can protrude through a slot 64 in the tube 1 to grip and hold a record from the inside. In addition, at least one of the clamping levers 31 has a top extension arm 65 above the pivot projection 59, which arm can engage a stop 67 on the member 5 for the end-stop function described below.

The operation of the stacking spindle may be explained as follows. In the initial position shown in FIG. 1 the actuating rod 3 is moved to its highest position by the changing device. In this highest position the cone 43 urges the ball 37 into the opening 41 of the tube 1, so that the control sleeve for the supporting levers 33 is locked in height to the tube. In this position the supporting levers 33 are swung out, and they can support a stack of records 53. In this position the clamping levers 21 are retracted in the outer tube by the clamping sleeve 15.

When the command disc of the changing device is started, in order to drop a new record onto the turntable, the acutating rod 3 is pulled downwards by the changing device. During this downward movement the cone 27 of the control sleeve 15 butts against the inward projection 29 of each individual clamping lever 31. The clamping levers are then pivoted about their projections 59, and from the inside the small projections 63 press against the wall of the hole of the next to the bottom record 69. This record is then blocked together with the stack 53 on top of it. The downward movement of the clamping sleeve 15 for the clamping levers 31 is now terminated.

The actuating rod 3 is pulled further downwards. The cone 43 then releases the ball 37. Next the snap ring 25 engages the top of the control sleeve 17 for the supporting levers 33, and moves the control sleeve 17 downwards, the lowermost record 71 being lowered over some length together with the supporting levers 33. When the oblique faces 55 of the arms 33 engage with the edge 57 in the tube 1, the supporting levers 33 pivot inwards, and the record 71, as is shown in FIG. 3, can drop. After the record 71 has been dropped, the actuating rod 3 is again moved upwards the supporting levers 33 swing out again, the cone 27 releases the clamping levers 31 and, raised by the snap ring 25, moves upwards together with the actuating rod 3. During the upward travel the cone 43 has again urged the ball 37 outwards and the control sleeve 17 is thus again locked at the predetermined height.

When the last record 73 has dropped and the changing device again initiates the changing cycle, the outward movement of the clamping levers 31 is not impeded when the actuating rod 3 is lowered. As a result of this, they swing out farther than in the case that a record is present. The extension arm 65 moves so far inwards, because the clamping lever 31 has two arms and is unbalanced, that it engages with the stop 67. Thus, the downward movement of the actuating rod 3 is blocked. Blocking of the downward movement is interpreted as an end-stop signal by the changing mechanism.

As appears from the description of the stacking spindle, the operation of this spindle is fully dependent on the changing device which lowers and raises the actuating rod 3. No spring forces at all have to be overcome, because the actuating rod is not pretensioned in any actuating direction. Moreover, all the changing commands, including the end-stop command, are transmitted to the stacking spindle or derived from the stacking spindle by the actuting rod only. The forces required for actuation are very small owing to the absence of a spring pretension, and the changing device can thus be simplified accordingly.

FIGS. 5 to 7 show how the stacking spindle in accordance with FIGS. 1 to 4 is actuated and how the end-stop command is derived from it.

FIG. 5 is a partial cross-section and a partial view of the changing mechanism. The stacking spindle is locked against rotation in an L-shaped slot 103 of a socket 105 by its outer tube 1 and a pin 4 in a similar way as a bayonet mount. The pin 13 of the actuating rod 3 is also locked to a push-pull rod 109 by means of a bayonet mount 107, which rod 109 constitutes an extension of the actuating rod. The push-pull rod 109 is guided in a sleeve 111, which is pressed into a mount 113 of the chassis 115. The turntable 117 is journalled on this mount 115 by means of a ball-bearing 119. Inside the push-pull rod 109 a push pin 121 is situated, which projects further downwards from the push-pull rod when the stacking spindle is fitted than when the stacking spindle has been removed.

If no stacking spindle is inserted, the push pin 121 projects only slightly downwards from the push-pull rod 109, and a locking bracket 123 can assume the position represented by a solid line in FIG. 5. This locking bracket 123 consists of a bar 125, which is pivotably journalled on a pulling lever 127 in the bearing 128. A hook-shaped bracket 129 projects upwards from the bar 125, which bracket engages with a stop edge 133 by means of a hook 131. This means that the locking bracket 129 only allows a downward travel a at the location of the push-pull rod 109. As is to be described hereinafter, this constitutes the end-stop command for the changing device. When the push pin 121 projects farther downwards when the stacking spindle is fitted, the locking bracket 123 assumes the dash-dotted position and the hook 131 cannot engage with the stop edge. This means that the pulling lever can pull the push-pull rod farther downwards, which corresponds to a normal changing cycle. The bar 125 is continuously urged against the push pin with the aid of a leaf spring 135.

The pulling lever 127 is pivotable about a spindle 137, which is secured to the chassis 115. A roller lever 139 is in its turn pivotably journalled on the pulling lever by a spindle bearing 143. Furthermore, a push lever 141 is journalled on the chassis by means of the spindle bearing 145. As is shown in FIGS. 5 and 6, the roller lever 139 has coupling hook 147, which passes through a slot 149 in the pulling lever 127 and which engages with the underside 151 of the pulling lever 127 under the influence of the tensile action of the springs 153, which are tensioned between a lug 155 of the pulling lever 127 and an indentation 157 of the roller lever 139.

The roller lever 139 travels over a control track 161 of the command disc 163 with a roller 159 which is mounted on said lever. During normal changing conditions the force of the springs 153 is adjusted so that the pulling lever 127 can pivot in the anti-clockwise direction from the roller 149 by way of the roller lever 139. During this pivotal movement the pulling lever 127 can take the push-pull rod 109 along, with which it engages non-positively at its lower end. For this purpose, the lower end of the push-pull rod passes through an opening 165 of the pulling lever 127 and extends underneath the underside 152 of the pulling lever 127 with laterally projecting tabs 167. Thus, the pivotal movements of the pulling lever 127 ensure that the push-pull rod 109 and consequently the actuating rod 3 can be moved up and down.

It is now assumed that a changing cycle is to be initiated by the command disc 163, which has been started, that the stacking spindle has been inserted, and that the stacking spindle carries a stack of records. The roller 159 then moves from the rest position shown in FIG. 5 up the hill 161' of the control track 161 in accordance with the dash-dot position in FIG. 6. As a result of this, the pulling lever 127 pivots in the anticlockwise direction and moves the push-pull rod 109 and the actuating rod 3 downwards. As the stacking spindle has been inserted and the locking bracket 123 has pivoted from a position A into a position B, the locking bracket 123 moves past the stop edge 133. The travel then corresponds to the distance b in FIG. 6. The stacking spindle then performs the changing cycle. When the command disc rotates farther, the roller 159 rolls down the hill 161' of the control track 161. In a changing movement which is coordinated therewith a roller 169 of the push lever 141 simultaneously moves up a hill 171' of a control track 171. The roller 169 with the arm 162 of the two-armed push lever 141 on which said roller is journalled is consequently urged downwards, the other arm 173 being pivoted upwards and urged against the underside 151 of the pulling lever 127. As a result of this, the pulling lever 127 is pivoted back in the clockwise direction, namely into the position represented by solid lines in FIG. 5. Simply stated, the roller lever 139 ensures that at the beginning of a changing cycle the pulling lever 127 is pivoted anticlockwise, the push-pull rod 109 and the actuating rod 3 being pulled downwards, and subsequently, when the changing cycle is terminated, the pressure lever 141 via its roller 169 ensures that the pulling lever 127 is pivoted back in the clockwise direction and thus that the push-pull rod 109 and the actuating rod 3 are moved upwards. In order to simplify the drawing, the positions, shown in FIGS. 5 and 6 of the control tracks 161 and 171 and of the rollers 159 and 169 moving on said tracks do not exactly correspond to the positions in accordance with FIG. 7. These changes were made in order to clarify the drawing.

The fact that in the absence of a record on the stacking spindle the actuating rod and with it the push-pull rod 109 can no longer be pulled out completely (the extension arm 65 has engaged the stop 67) is interpreted by the changing device as the end-stop command. When the roller 159 now moves up the hill 161' of the control track 161, the pulling lever 127 cannot pivot far enough, because it is retained halfway. The changing device compensates for these counter-acting forces, in that the roller lever 139 expands the springs 153 and moves up the hill 161' without the pulling lever 127 being swung out completely. This position is represented by solid lines in FIG. 6 (the locking bracket is again dash-dotted), in which the coupling hook 147 in its position represented by solid lines is lifted substantially from the underside 151 of the pulling lever 127. Thus, the roller lever 139 constitutes a kind of overload protection.

If no stacking spindle is fitted in the sleeve 111 and thus coupled to the push-pull rod 109, the locking bracket 123 assumes position A. The hook 131 then engages with the stop edge 133. If upon termination of a playing cycle the control track 161 urges the pulling lever 127 to pivot in the anticlockwise direction, the hook 131 blocks the pulling lever so that it cannot pivot fully (locking bracket 123 in the position represented by solid lines in FIG. 6). In the absence of a record the roller lever 139 is again lifted off the pulling lever 127 with its coupling hook (dash-dotted position of the pulling lever 139 in FIG. 6). This position, in which the pulling lever 127 has pivoted only slightly (position represented by solid lines in FIG. 6), is an indication for the changing mechanism to return the pick-up arm. No matter whether a stacking spindle has been inserted in the changer and there is no more record on the stacking spindle, or whether the stacking spindle has been removed, the return of the pick-up arm is always initiated in both situations.

FIG. 7 is a view at the underside of the changing device as is shown in FIGS. 5 and 6. The position of the command disc corresponds to the position of FIG. 5. As can be seen in FIG. 7, the U-shaped profiled pulling lever 127 pivots about the spindle 137 which is journalled on the chassis. A spindle 143 for the roller lever 139 is in its turn journalled on the pulling lever 127, the roller 159 scanning the control track 161 with its hill 161'. Springs 153, shown as dot-dash lines, provide a pre-tension biasing force for the roller lever 139. A leaf spring 135 urges the bar 125 continually against the push rod 121. The push lever 141 is journalled on the chassis 115 by means of the spindle 145. The push lever 141 bears against the underside of the pulling lever 127 with its arm 173 and derives its movement from the control track 171, by way of the roller 169.

What is claimed is:

1. A stacking spindle for a record changer with an end-stop function for the playing mode, having an outer tube; groups of clamping and supporting levers accommodated in the tube; an actuating rod slidably guided in said tube, adapted to be controlled by a changing device in the changer; and a clamp sleeve movable within the tube about said rod for actuating the group of clamping levers, wherein
    said stacking spindle comprises a single actuating rod only, guided inside the tube; a control sleeve slidably mounted about said rod within said tube for moving said supporting levers, said control sleeve and said rod being movable with respect to each other; means for locking the control sleeve with respect to the tube in response to movement of said rod to a given positon; and means for moving said control sleeve in response to movement of said actuating rod a given distance from said given position.

2. A spindle as claimed in claim 1 wherein normal changing cycle movement of the actuating rod is determined solely by the changing device and is free of unidirectional bias forces in said spindle.

3. A spindle as claimed in claim 1 wherein said means for locking the control sleeve includes a latching element which engages the actuating rod to lock the control sleeve when the clamping levers are in a retracted position 4. A spindle as claimed in claim 3 wherein said latching element is a ball captured in a radial bore in the control sleeve, said outer tube has an opening having a diameter less than that of the ball, and the actuating rod has a sloping surface which releases the ball for inward movement upon movement of the actuating rod from said given position a distance such that outward movement of the clamping levers is completed; and the spindle includes another element fixed in position on the actuating rod for engaging the control sleeve and moving the control sleeve upon farther travel of the rod from said given position.

5. A spindle as claimed in claim 1 comprising means for pivotally mounting at least one of said clamping levers to permit pivotal movement of said clamping lever a farther distance in the absence of a record on the spindle, said at least one clamping lever having an extension arm arranged to pivot inward in response to said farther outward pivoting, a stop edge, and means connecting said stop edge to the actuating rod so as to stop movement of the actuating rod in response to engagement by said stop edge with said extension arm upon changing cycle movement of the actuating rod in the absence of a record on a spindle.

* * * * *